(12) United States Patent
Wong et al.

(10) Patent No.: US 10,528,081 B2
(45) Date of Patent: Jan. 7, 2020

(54) HEAD MOUNTED WEARABLE DEVICE POWER SUPPLY SYSTEM

(71) Applicants: Hong W. Wong, Portland, OR (US); Songnan Yang, San Jose, CA (US); Xiaoguo Liang, Shanghai (CN); Wah Yiu Kwong, Hillsboro, OR (US); Cheong W. Wong, Beaverton, OR (US); INTEL CORPORATION, Santa Clara, CA (US)

(72) Inventors: Hong W. Wong, Portland, OR (US); Songnan Yang, San Jose, CA (US); Xiaoguo Liang, Shanghai (CN); Wah Yiu Kwong, Hillsboro, OR (US); Cheong W Wong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/531,712

(22) PCT Filed: Dec. 26, 2014

(86) PCT No.: PCT/CN2014/095076
§ 371 (c)(1),
(2) Date: May 30, 2017

(87) PCT Pub. No.: WO2016/101244
PCT Pub. Date: Jun. 30, 2016

(65) Prior Publication Data
US 2017/0329365 A1    Nov. 16, 2017

(51) Int. Cl.
*G06F 1/16* (2006.01)
*G02B 27/01* (2006.01)
(Continued)

(52) U.S. Cl.
CPC .............. *G06F 1/163* (2013.01); *A41B 1/00* (2013.01); *A41B 1/08* (2013.01); *A41D 1/002* (2013.01);
(Continued)

(58) Field of Classification Search
CPC ........ G02B 27/01; G02B 27/017; G06F 1/163
(Continued)

(56) References Cited

U.S. PATENT DOCUMENTS 4,636,866 A * 1/1987 Hattori ............... G02B 27/2228
345/8
5,416,310 A * 5/1995 Little .................... G06F 1/163
2/102

(Continued)

FOREIGN PATENT DOCUMENTS

CN    1968804 A    5/2007
CN    202502297 U  10/2012
(Continued)

OTHER PUBLICATIONS

International Preliminary Report on Patentability and Written Opinion issued in PCT Application No. PCT/CN2014/095076, dated Jul. 6, 2017, 6 pages.

(Continued)

*Primary Examiner* — Adrian S Wilson
(74) *Attorney, Agent, or Firm* — Grossman, Tucker, Perreault & Pfleger, PLLC

(57) ABSTRACT

One embodiment provides an apparatus. The apparatus includes a source conductive path to couple to a load conductive path and to a power source. The source conductive path is included in a garment and the load conductive path is related to a head mounted wearable device (HMWD).

18 Claims, 8 Drawing Sheets

(51) Int. Cl.
*G06F 1/26* (2006.01)
*H02J 7/00* (2006.01)
*H04B 5/00* (2006.01)
*H02J 50/10* (2016.01)
*A41B 1/08* (2006.01)
*A41D 1/00* (2018.01)
*A41D 1/04* (2006.01)
*A41D 1/18* (2006.01)
*A41D 3/00* (2006.01)
*A41D 31/02* (2019.01)
*A41F 9/00* (2006.01)
*A41D 27/20* (2006.01)
*A41B 1/00* (2006.01)
*A41D 1/02* (2006.01)
*A41D 3/02* (2006.01)

(52) U.S. Cl.
CPC ............... *A41D 1/02* (2013.01); *A41D 1/04* (2013.01); *A41D 1/18* (2013.01); *A41D 3/00* (2013.01); *A41D 3/005* (2013.01); *A41D 3/02* (2013.01); *A41D 27/205* (2013.01); *A41D 31/02* (2013.01); *A41F 9/002* (2013.01); *G02B 27/017* (2013.01); *G06F 1/1635* (2013.01); *G06F 1/1698* (2013.01); *G06F 1/26* (2013.01); *H02J 7/0063* (2013.01); *H02J 50/10* (2016.02); *H04B 5/0037* (2013.01); *H04B 5/0075* (2013.01); *G02B 2027/0178* (2013.01)

(58) Field of Classification Search
USPC .................................................. 361/679.03
See application file for complete search history.

(56) References Cited

U.S. PATENT DOCUMENTS

| | | | |
|---|---|---|---|
| 5,722,762 A | 3/1998 | Soll | |
| 5,774,338 A * | 6/1998 | Wessling, III | A41D 13/0012 2/94 |
| 5,844,824 A * | 12/1998 | Newman | G06F 1/163 345/156 |
| 5,912,653 A * | 6/1999 | Fitch | G09F 9/35 345/7 |
| 5,995,936 A * | 11/1999 | Brais | G02B 27/017 369/25.01 |
| 6,356,437 B1 * | 3/2002 | Mitchell | G06F 1/163 342/352 |
| 6,443,347 B1 * | 9/2002 | Elizalde | A45F 3/14 224/245 |
| 6,535,102 B2 * | 3/2003 | Marmaropoulos | G01D 5/16 338/210 |
| 6,560,029 B1 | 5/2003 | Dobbie | |
| 6,563,424 B1 | 5/2003 | Kaario et al. | |
| 6,843,012 B1 * | 1/2005 | Dodd | G09F 21/02 224/627 |
| 6,895,261 B1 * | 5/2005 | Palamides | H04B 1/385 455/100 |
| 7,030,855 B2 * | 4/2006 | Metcalf | G09G 3/20 345/108 |
| 7,265,970 B2 * | 9/2007 | Jordan | G09F 21/02 361/679.27 |
| 8,107,653 B2 * | 1/2012 | Wolfe | A41D 1/002 381/301 |
| 2002/0015008 A1 * | 2/2002 | Kishida | G06F 1/163 345/7 |
| 2002/0094845 A1 * | 7/2002 | Inasaka | H04M 1/05 455/566 |
| 2002/0145849 A1 * | 10/2002 | Peterson, III | G06F 1/163 361/679.03 |
| 2002/0186180 A1 * | 12/2002 | Duda | A42B 1/245 345/8 |
| 2003/0068057 A1 * | 4/2003 | Miller | H04B 1/385 381/334 |
| 2003/0161097 A1 * | 8/2003 | Le | G06F 1/163 361/679.03 |
| 2008/0169998 A1 * | 7/2008 | Jacobsen | G02B 27/0172 345/8 |
| 2009/0252345 A1 | 10/2009 | Le et al. | |
| 2012/0075168 A1 * | 3/2012 | Osterhout | G02B 27/017 345/8 |
| 2012/0204307 A1 * | 8/2012 | De Mattei | A41D 1/002 2/69 |
| 2012/0293935 A1 * | 11/2012 | Sherlock | G06F 1/163 361/679.03 |
| 2013/0007949 A1 | 1/2013 | Kurs et al. | |
| 2013/0250503 A1 * | 9/2013 | Olsson | G02C 5/12 361/679.03 |
| 2015/0016777 A1 * | 1/2015 | Abovitz | G02B 27/225 385/37 |
| 2017/0068119 A1 * | 3/2017 | Antaki | H04N 5/2251 |

FOREIGN PATENT DOCUMENTS

| | | |
|---|---|---|
| CN | 203336255 U | 12/2013 |
| CN | 103607674 A | 2/2014 |
| CN | 103873750 A | 6/2014 |

OTHER PUBLICATIONS

International Search Report and Written Opinion issued in PCT Application No. PCT/CN2014/095076, dated Jul. 29, 2015, 12 pages.
Extended European search report received in Patent Application No. PCT/CN2014095076, dated Aug. 1, 2018, 9 pages.
Japanese Office Action in Japanese Patent Application No. 2017-528201, 8 pages.
Chinese Office Action received in Chinese Patent Application No. 201480083765 dated Jul. 22, 2019, 14 pages.
Japanese Office Action in Japanese Patent Application No. 2017-528201 dated Sep. 18, 2019.

* cited by examiner

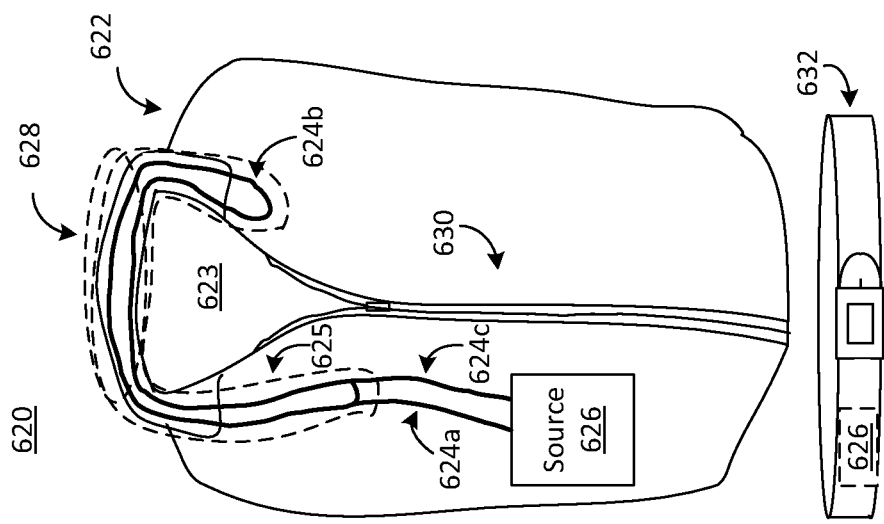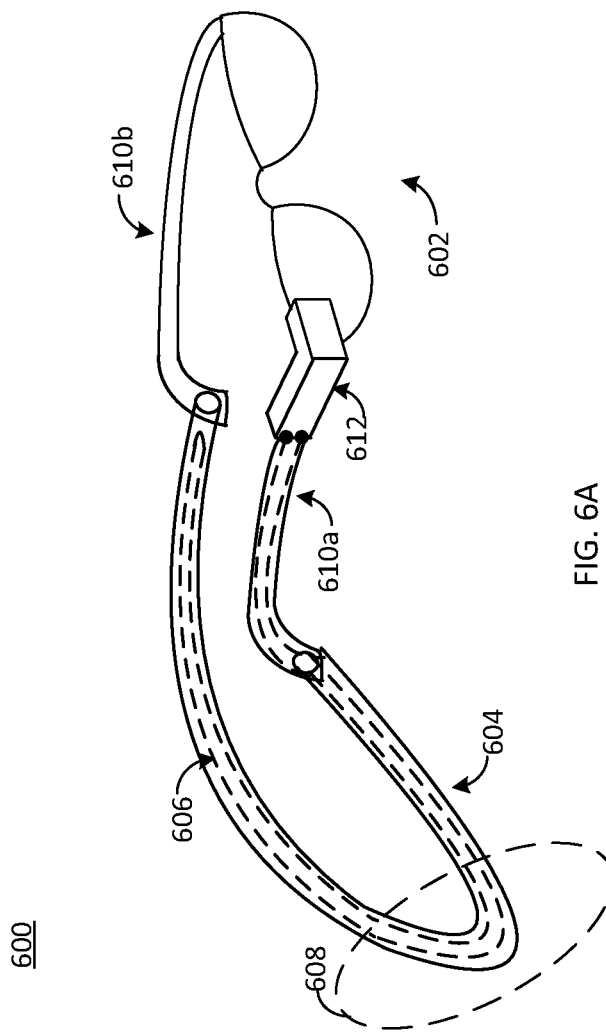

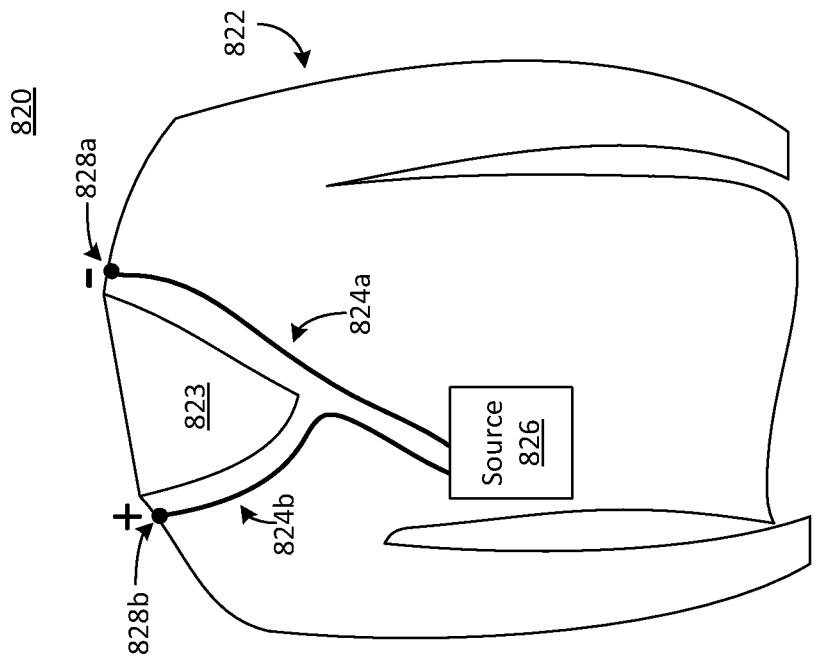
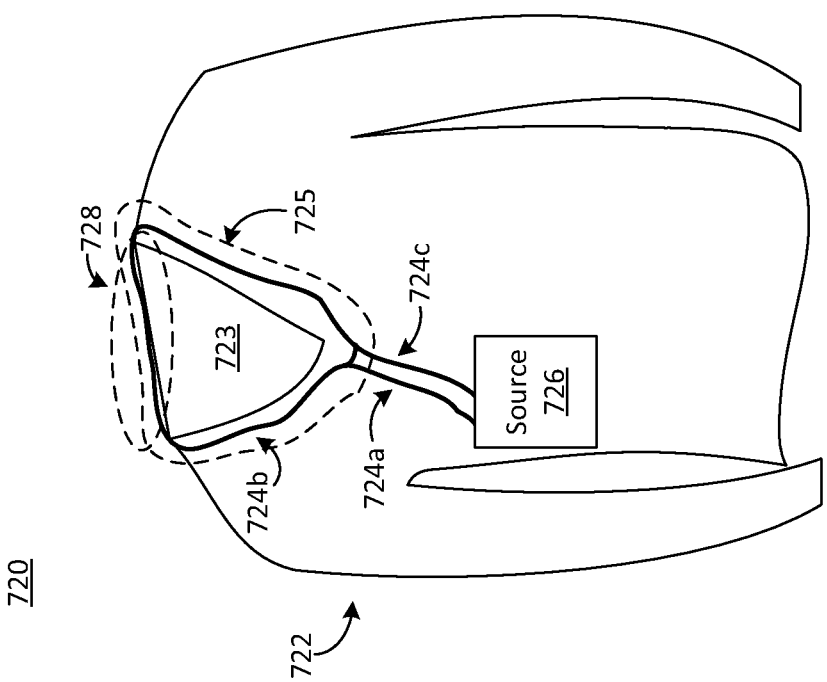
FIG. 8
FIG. 7

US 10,528,081 B2

HEAD MOUNTED WEARABLE DEVICE POWER SUPPLY SYSTEM

FIELD

The present disclosure relates to a power supply system, in particular to, a head mounted wearable device power supply system.

BACKGROUND

Head mounted wearable electronic devices (HMWDs), including, e.g., head mounted displays (HMDs), may be powered by rechargeable batteries. For a given battery technology, as battery capacity increases, battery size (and weight) also increases. Batteries used to power HMWDs are limited in size and weight due, at least in part, to user comfort considerations. Such batteries may be similarly limited in capacity that may limit a time duration of operation of the HMWD between charges.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 6A illustrates another example load portion of an HMWD power supply system consistent with one embodiment of the present disclosure;

FIG. 6B illustrates another example source portion related to the load portion of the HMWD power supply system of FIG. 6A consistent with an embodiment of the present disclosure;

FIG. 7 illustrates another example source portion related to the load portion of the HMWD power supply system of FIG. 5A consistent with one embodiment of the present disclosure;

FIG. 8 illustrates another example source portion consistent with one embodiment of the present disclosure;

Figure 1A:
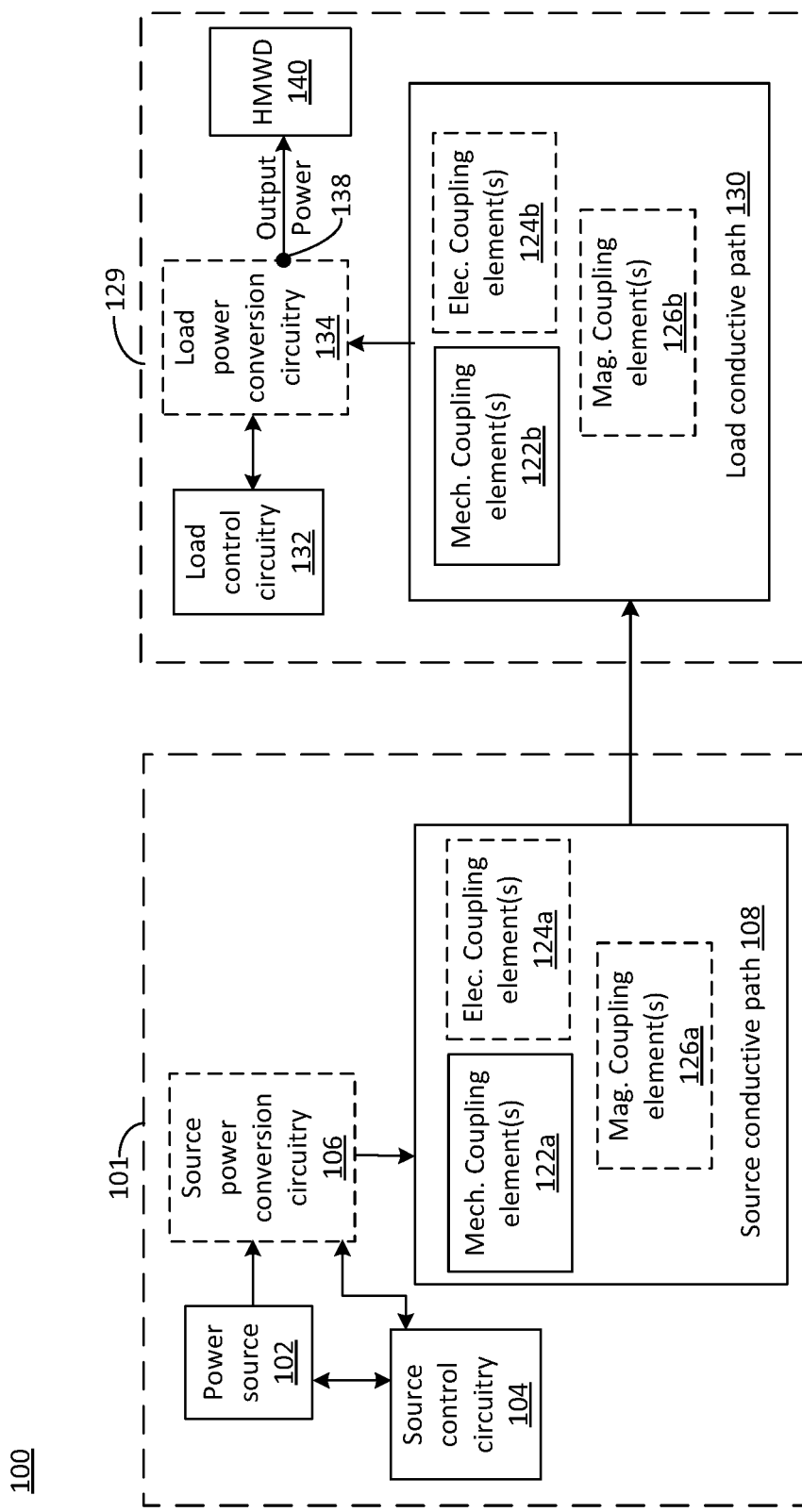
FIG. 1A illustrates a functional block diagram of a head mounted wearable device (HMWD) power supply system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

The time duration of operation between charges may be extended by supplementing the head mounted wearable device (HMWD) batteries with a power source, e.g., a battery pack, that is not head mounted. The power source may then be coupled to the HMWD, thus providing additional capacity without adding to the size and/or weight of the rechargeable battery included in the HMWD.

Generally, this disclosure relates to an HMWD power supply system (and method). The methods and systems include a source conductive path configured to couple to a load conductive path and to a power source (e.g., a battery pack). The source conductive path may be included in a garment, e.g., a shirt, a blouse, a jacket, a vest, a sweater, a pullover, a coat, a belt, etc. The power source may be included in and/or attached to the garment. The load conductive path is configured to couple to the source conductive path and to a load (e.g., the HMWD). At least a portion of the load conductive path may be included in a strap coupled to the HMWD configured to at least partially encircle the user's neck. For example, the strap may correspond to a lanyard configured to hang the HMWD from the user's neck when not in use.

The source conductive path and/or the load conductive path may include one or more coupling element(s) configured to couple electrical and/or magnetic energy from the source conductive path to the load conductive path when a user is wearing the garment, the HMWD and the strap. The source conductive path and/or coupling element(s) are further configured to provide a positioning tolerance between the source conductive path and the load conductive path for ease of coupling. For example, in a loosely coupled system, positioning tolerance may be in the range of 20 millimeters (mm) to 40 mm. In another example, for a tightly coupled system, positioning tolerance may be in the range of 5 mm to 10 mm.

The coupling element(s) are further configured to provide ease of decoupling the load conductive path when the HMWD is removed from the user's head. In an embodiment, the source conductive path and load conductive path are configured to provide wireless energy transfer between the source conductive path and the load conductive path. In another embodiment, the source conductive path and load conductive path are configured to provide wired energy transfer between the source conductive path and the load conductive path.

HMWDs may include, but are not limited to, wearable computing devices, head mounted displays (HMDs), optical HMDs, etc. A wearable computing device is a computing device configured to be worn by, e.g., a user. An HMD is a display device, worn on the head and/or as part of a helmet, that includes a relatively small display optic in front of one eye (monocular HMD) or each eye (binocular HMD). An optical HMD is a wearable display that is configured to reflect projected images while also allowing the user to see through it. HMDs may include, but are not limited to, gaming and/or virtual reality HMDs (e.g., Oculus™ Rift™). Google® Glass™ is one example of an optical HMD and may be considered a wearable computing device.

FIG. 1A illustrates a functional block diagram of an HMWD power supply system 100 consistent with various embodiments of the present disclosure. System 100 includes a power source 102, a source conductive path 108 and a load conductive path 130. In some embodiments, system 100 may include source power conversion circuitry 106 and/or load power conversion circuitry 134. For example, power source 102 may include one or more batteries that may be configured as a battery pack. The batteries may or may not be rechargeable. System 100 may further include source control circuitry 104 and/or load control circuitry 132 configured to manage operation of power source 102 and source power conversion circuitry 106 and load power conversion circuitry 134, respectively.

Power source 102, source control circuitry 104, source conductive path 108 and source power conversion circuitry 106, if present, may correspond to a source portion 101, as described herein. Load conductive path 130, load control circuitry 132 and load power conversion circuitry 134, if present, may correspond to a load portion 129.

Source power conversion circuitry 106 may be configured to generate a time-varying output voltage and/or current (i.e., time varying waveform) based, at least in part, on an input from the power source 102. In another example, source power conversion circuitry 106 may include a DC (direct current)/DC converter configured to level shift a DC input voltage and/or current to a different DC output voltage and/or current.

Load power conversion circuitry 134 is configured to produce a DC output voltage and/or current (i.e., DC energy). For example, load power conversion circuitry 134 may include a rectifier, a regulator, a capacitor and associated circuitry (not shown) configured receive a time varying input and to produce a DC output. In another example, load power conversion circuitry 134 may include a DC/DC converter configured to level shift a DC input voltage and/or current to one or more corresponding DC output voltage(s) and/or current(s). The DC output voltage(s) and/or current(s) (i.e., DC output power) may then be configured to power (i.e., supply) the HMWD and/or charge batteries associated with the HMWD via output port 138.

Source conductive path 108 and/or load conductive path 130 each include one or more conductive element(s) (e.g., wire(s)). Each conductive element may include one or more conductive material(s) configured to carry (i.e., conduct) electrical and/or magnetic energy. Conductive materials may include, but are not limited to, metals (e.g., copper, aluminum), non-metal conductors such as graphite and/or conductive polymers (e.g., polyacetylene, polypyrrole, polyaniline), etc. At least a portion of source conductive path 108 may be rigid, semi-rigid or flexible. At least a portion of load conductive path 130 may be rigid, semi-rigid or flexible.

Source conductive path 108 is configured to couple to load conductive path 130 and to power source 102. Load conductive path 130 is configured to couple to source conductive path 108a and to a load, e.g., HMWD 140. In an embodiment, source conductive path 108 and load conductive path 130 are configured to carry respective time varying waveforms (voltage and/or current). In another embodiment, source conductive path 108 and load conductive path 130 are configured to carry DC voltages and/or DC currents (i.e., DC power). Source conductive path 108 may include one or more coupling element(s) 122a, 124a, 126a. Load conductive path 130 may include one or more coupling element(s) 122b, 124b, 126b.

Coupling element(s) 122a, 124a, 126a, 122b, 124b, 126b are configured to couple source conductive path 108 and load conductive path to facilitate transmission of electrical and/or magnetic energy from source conductive path 108 to load conductive path 130 and from power source 102 to load 140. Coupling element(s) 122a, 124a, 126a, 122b, 124b, 126b may be configured to provide electrical, magnetic and/or mechanical coupling between source conductive path 108 and load conductive path 130. Coupling element(s) 122a, 124a, 126a, 122b, 124b, 126b may thus include mechanical coupling elements 122a, 122b, electrical coupling elements 124a, 124b and/or magnetic coupling elements 126a, 126b.

Mechanical coupling elements 122a, 122b are configured to provide a detachable mechanical coupling between source conductive path 108 and load conductive path 130. Mechanical coupling elements 122a, 122b may be configured to detachably couple the source conductive path 108 and load conductive path 130 when the load conductive path 130 is positioned within a proximity to the source conductive path 108 and to detach when a force is applied to, for example, the load conductive path 130. For example, mechanical coupling elements 122a, 122b may include fasteners that have a first portion and a second portion configured to detachably attach each to the other. The first portion 122a may be included in the source conductive path 108 and the second portion 122b may be included in the load conductive path 130. Fasteners may include, but are not limited to, snap closures, fabric hook and loop fasteners (e.g., Velcro®), etc.

In another example, mechanical coupling elements 122a, 122b may include one or more magnetic element(s) (e.g., magnet(s)) configured to provide detachable mechanical coupling. Each magnet may include one or more ferromagnetic material(s). Ferromagnetic material(s) may include, but are not limited to, iron, nickel, cobalt, iron alloys (e.g., alnico that includes aluminum (Al), nickel (Ni) and cobalt (Co) in addition to iron and may include copper and/or titanium), alloys of rare earth metals (e.g., neodymium, samarium-cobalt, neodymium iron boron (NIB)), naturally occurring minerals (e.g., lodestone), etc. In an embodiment, mechanical coupling elements 122a, 122b may include a plurality of magnets configured to detachably couple the source conductive path 108 to the load conductive path 130. For example, one or more magnet(s) 122a may be attached to the source conductive path 108 and/or one or more magnet(s) 122b may be attached the load conductive path 130, as described herein.

Electrical coupling element(s) 124a, 124b may be configured to electrically couple source conductive path 108 and load conductive path 130 to support energy transfer from source conductive path 108 to load conductive path 130. In some embodiments, the electrical coupling element(s) 124a, 124b may correspond to one or more mechanical coupling element(s) 122a, 122b. In an embodiment, the electrical coupling elements 124a, 124b may include a plurality of electrical contacts configured to detachably electrically couple the source conductive path 108 to the load conductive path 130. In this embodiment, the source conductive path 108 and the load conductive path 130 may form an electrically conductive circuit when electrically coupled. In this embodiment, source conductive path 108 may be configured to receive a DC voltage and/or current (i.e., DC energy) from power source 102 and to provide a corresponding DC voltage and/or current (i.e., DC energy) to load conductive path 130 via the electrical contacts 124a, 124b. In this embodiment, source conductive path 108 and load conductive path 130 may generally not include coil(s). In some embodiments, the electrical coupling elements 124a, 124b may correspond to electrically conductive magnets.

In an embodiment, magnetic coupling element(s) 126a, 126b may be configured to provide magnetic coupling (e.g., inductive coupling or resonant coupling) between source conductive path 108 and load conductive path 130 to support energy transfer from source conductive path 108 to load conductive path 130. Magnetic coupling element(s) 126a, 126b may include one or more coil(s) (i.e., winding(s)) that may be formed by and/or included in source conductive path 108 and load conductive path 130, respectively. Each coil 126a, 126b may include one or more turn(s) (i.e., loop(s)) of wire. In some embodiments, the coil(s) 126a and/or 126b may include a magnetic core. Magnetic core material may include, but is not limited to, ferromagnetic metals (e.g. iron, silicon steel), ferrimagnetic compounds (e.g., soft ferrites such as manganese-zinc ferrite, nickel-zinc ferrite), etc. A magnetic core is configured to enhance magnetic coupling efficiency, i.e., may increase a coupling coefficient.

Electrical and/or magnetic energy may be transferred from source conductive path 108, e.g., transmitter coil(s) 126a, to load conductive path 130, e.g., receiver coil(s) 126b, via magnetic induction and/or magnetic resonance. Whether the coupling is configured as tightly coupled or loosely coupled is based, at least in part on relative positions of the transmitter coil(s) 126a and the receiver coil(s) 126b. Loosely coupled configurations may include resonant coupling. Tightly coupled configurations may include inductive coupling and/or resonant coupling. Resonant coupling provides a relatively larger positional tolerance compared to inductive coupling. In resonant coupling, resonance is configured to provide a relatively higher coupling coefficient, thus facilitating the relatively larger positional tolerance.

In magnetic induction (i.e., inductive coupling) and/or magnetic resonance (i.e., resonant coupling), an alternating (i.e., time varying) magnetic field (flux) produced in a transmitter coil is configured to induce an electromotive force (emf), i.e., a voltage, in a receiver coil. An amount of energy transferred between the source conductive path 108 (and transmitter coil(s) 126a) and the load conductive path 130 (and receiver coil(s) 126b) is related to one or more of a distance between the transmitter coil(s) 126a and receiver coil(s) 126b, coil diameters, frequency of the alternating magnetic flux in the transmitter coil(s) 126a, magnitude of the alternating magnetic flux in the transmitter coil(s) 126a, number(s) of turns in the coil(s), the relative orientation of the transmitter and receiver coils 126a, 126b and/or the materials used for the core if a magnetic core is used. For resonant coupling, the amount of energy transferred is further related to resonance tuning of the transmitter and receiver coils 126a, 126b.

Generally, a fraction of the magnetic flux generated by the transmitter coil(s) 126a impinges on the receiver coil(s) 126b and thus contributes to the energy transmission between the source conductive path 108 and the load conductive path 130. A relatively higher amount of flux reaching the receiver coil 126b for a same source magnetic flux corresponds to relatively better coupling (i.e., higher coupling coefficient and/or increased coupling efficiency) between the transmitter coil(s) 126a and the receiver coil(s) 126b.

Figure 1C:
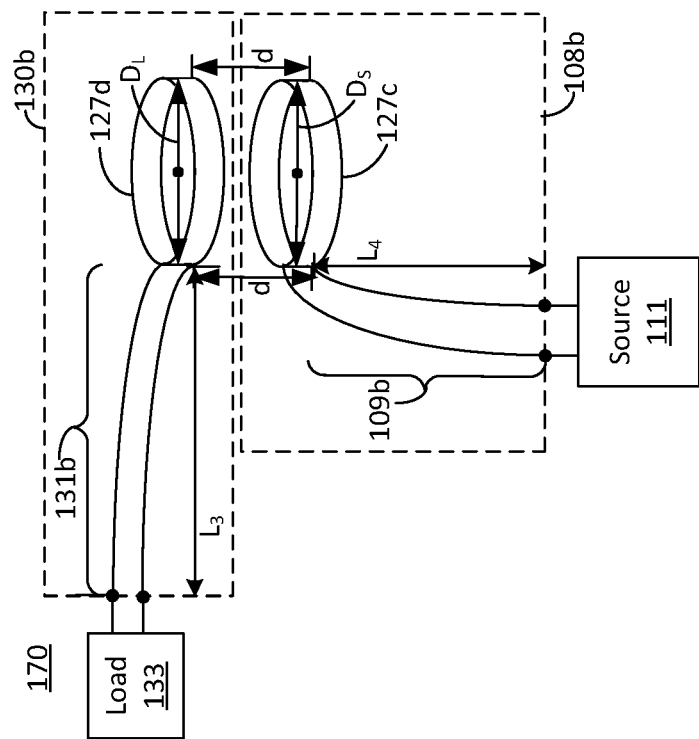
FIG. 1C is a sketch of a tightly (i.e., closely) coupled configuration consistent with various embodiments of the present disclosure.
Figure 1B:
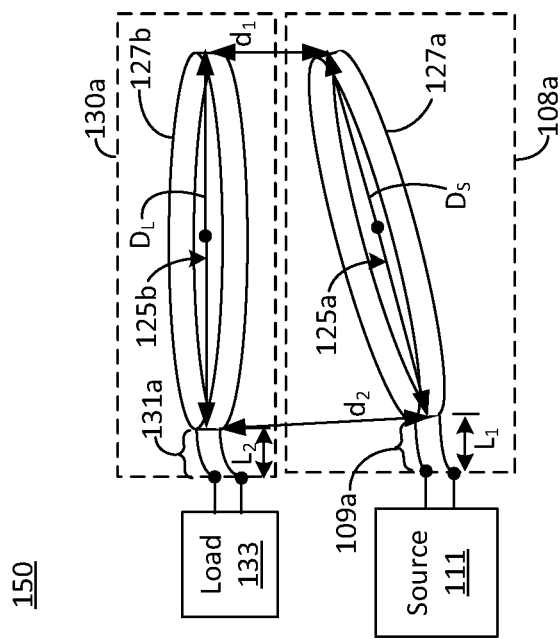
FIG. 1B is a sketch of a loosely coupled configuration consistent with various embodiments of the present disclosure.

FIG. 1B is a sketch of a loosely coupled configuration 150 consistent with various embodiments of the present disclosure. Configuration 150 includes a source conductive path 108a and a load conductive path 130a that correspond to source conductive path 108 and load conductive path 130 of FIG. 1A. Source conductive path 108a includes a transmitter coil 127a and a source conductive path portion 109a configured to couple the transmitter coil 127a to a source 111. Source 111 includes power source 102 and source power conversion circuitry 106. Load 133 includes load power conversion circuitry 134 and may include an HMWD. Load conductive path 130a includes a receiver coil 127b and a load conductive path portion 131a configured to couple the receiver coil 127b to a load 133. Transmitter coil 127a and/or receiver coil 127b may each include one or more turn(s).

Transmitter coil 127a and receiver coil 127b are examples of magnetic coupling elements 126a, 126b, respectively, of FIG. 1A. Transmitter coil 127a and receiver coil 127b are configured for resonant coupling, as described herein. Thus, transmitter coil 127a and/or receiver coil 127b may include a magnetic core, as described herein. The transmitter coil 127a and receiver coil 127b are illustrated as generally circular for ease of illustration. Transmitter coil 127a and receiver coil 127b may be generally circular, ellipsoidal, generally rectangular and/or a random shape. Transmitter coil 127a has a diameter $D_S$ and receiver coil 127b has a diameter $D_L$. Source conductive path portion 109a has a length $L_1$ and load conductive path portion 131a has a length $L_2$. A first end of transmitter coil 127a is positioned a distance $d_1$ from a first end of receiver coil 127b and a second end of transmitter coil 127a is positioned a distance $d_2$ from a second end of receiver coil 127b. In one example of configuration 150, distance $d_1$ is less than distance $d_2$, diameter $D_L$ and/or diameter $D_S$; $L_1$ is less than $D_S$; and $L_2$ is less than $D_L$. In this example the transmitter coil 127a generally corresponds to the source conductive path 108a and the receiver coil 127b generally corresponds to the load conductive path 130a. In other words, the source conductive path portion 109a and the load conductive path portion 131a may be relatively short compared to a diameter of the transmitter coil 127a and receiver coil 127b, respectively. An inner region 125a encircled by transmitter coil 127a and an inner region 125b encircled by receiver coil 127b may be related to a coupling region. For example, a magnetic coupling region may be bounded by the transmitter coil 127a and the receiver coil 127b. At least a portion of the magnetic coupling region may be included in a mechanical coupling region, as described herein.

For example, for a loosely coupled configuration, the distance $d_1$ may be in the range of 20 mm to 40 mm, a cross-sectional diameter of each coil 127a, 127b may be in the range of 5 mm to 40 mm and the coils 127a, 127b may generally include a plurality of turns. Allowable values of the distance $d_1$ may be related to transmitted power. The distance $d_2$ is generally greater than $d_1$ and may vary. The cross-sectional diameter of each coil 127a, 127b may be related to coil material(s) and/or number of turns in each coil. Loosely coupled configurations may include resonant coupling. The diameters of the coils $D_L$, $D_S$ may be related to physical geometry related to, for example, garment size, neck opening, user head size, etc. The diameters of the coils $D_L$, $D_S$ may generally depend on operating frequency. For example, an operating (i.e., resonant) frequency may be in the range of 1.0 Megahertz (MHz) to 50 MHz for a loosely coupled configuration configured for resonant coupling. The resonant frequency may be related to number of turns in the coils, coil material, coil diameters and/or cross-sectional diameters. For example, the operating frequency may be 6.78 MHz. For example, a relatively lower resonant frequency may correspond to a relatively larger number of turns and thus, a relatively larger cross-sectional diameter.

FIG. 1C is a sketch of a tightly (i.e., closely) coupled configuration 170 consistent with various embodiments of the present disclosure. Configuration 170 includes a source conductive path 108b and a load conductive path 130b that correspond to source conductive path 108 and load conductive path 130 of FIG. 1A. Source conductive path 108b includes a transmitter coil 127c and a source conductive path portion 109b configured to couple the transmitter coil 127c to a source 111. Load conductive path 130b includes a receiver coil 127d and a load conductive path portion 131b configured to couple the receiver coil 127d to a load 133. Transmitter coil 127c and receiver coil 127d generally include a plurality of turns of wire. Transmitter coil 127c and receiver coil 127d are examples of magnetic coupling elements 126a, 126b, respectively, of FIG. 1A.

Transmitter coil 127c and receiver coil 127d may be configured for inductive coupling or resonant coupling, as described herein. The transmitter coil 127c and receiver coil 127d are illustrated as generally circular for ease of illustration. Transmitter coil 127c and receiver coil 127d may be generally circular, ellipsoidal, generally rectangular and/or a random shape. Transmitter coil 127c has a diameter $D_S$ and receiver coil 127d has a diameter $D_L$. Source conductive path portion 109b has a length $L_3$ and load conductive path portion 131b has a length $L_4$. Transmitter coil 127c is positioned a distance d from receiver coil 127d. In one example of configuration 170, distance d is less than diameter $D_L$ and/or diameter $D_S$; $L_3$ is greater than $D_S$; and $L_4$ is greater than $D_L$. In this example, the transmitter coil 127c generally corresponds to at most a portion of the source conductive path 108b and the receiver coil 127d generally corresponds to at most a portion of the load conductive path 130b. This example may include a plurality of transmitter coils 127c and/or a plurality of receiver coils 127d that are generally positioned a distance from the HMWD (i.e., load 133) and/or the source 111. The distance may be relatively large compared to the diameter of the transmitter coil(s) 127c and the receiver coil(s) 127d. The plurality of transmitter coils, e.g., transmitter coil 127c, and the plurality of receiver coils, e.g., receiver coil 127d, may be positioned in a coupling region, as described herein. The coupling region may include a mechanical coupling region and/or a magnetic coupling region. Tightly coupled configurations may include inductive coupling and/or resonant coupling.

For example, for an inductive tightly coupled configuration, a distance d between transmitter coil(s) and receiver coil(s) may be in the range of 5 mm to 10 mm, a coil cross-sectional diameter may be in the range of 0.01 mm to 15 mm and the coils may generally include a plurality of turns. The diameters of the coils $D_L$, $D_S$ may generally be related to operating frequency. Further, coils configured for resonant coupling may have a relatively higher operating frequency and may be relatively smaller compared to coils configured for inductive coupling. For example, an operating frequency for the inductive tightly coupled configuration may be in the range of 50 hertz (Hz) to 500 kilohertz (kHz). For example, an operating frequency for the tightly coupled configuration may be in the range of 100 kHz to 300 kHz.

Figure 2:
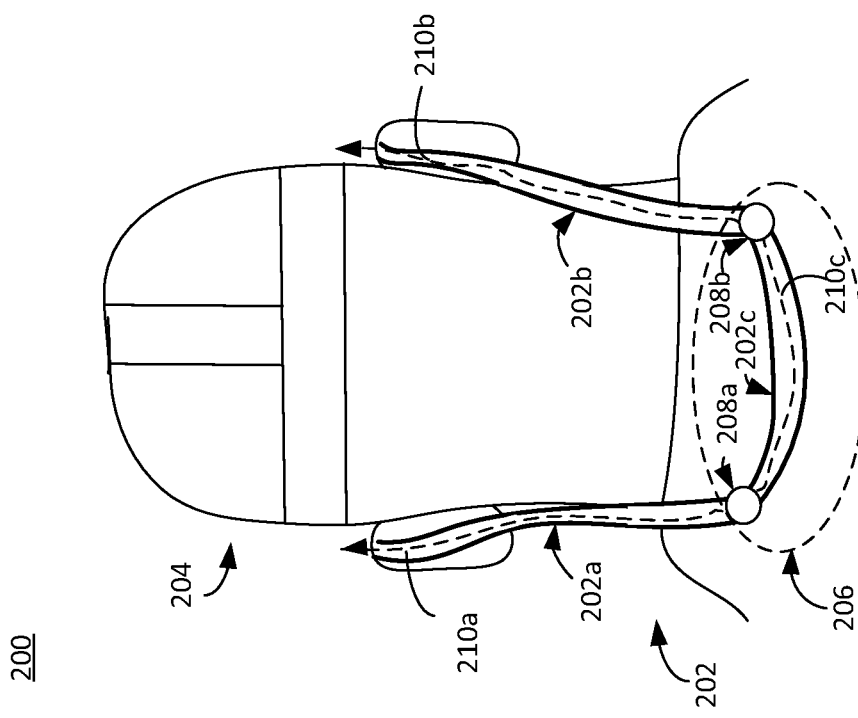
FIG. 2 illustrates an example load conductive path and coupling region consistent with various embodiments of the present disclosure.

FIG. 2 illustrates an example 200 load conductive path and coupling region consistent with various embodiments of the present disclosure. Example 200 includes a strap 202 that includes a first portion 202a, a second portion 202b and a third portion 202c. The first strap portion 202a and second strap portion 202b each extend from a user's 204 respective ear to a mechanical coupling region 206 included in a yoke portion of the user's garment (e.g., shirt, jacket, etc.). The first strap portion 202a and the second strap portion 202b are coupled at respective first ends to an HMWD (not shown). The third strap portion 202c is included in and/or adjacent to the mechanical coupling region 206. The first strap portion 202a and second strap portion 202b may each include a respective portion 210a, 210b of a load conductive path.

In some embodiments, strap 202 may include and/or be coupled to a first feature 208a and a second feature 208b. In an embodiment, first feature 208a and second feature 208b may correspond to mechanical coupling elements, as described herein. In an embodiment, first feature 208a and second feature 208b may correspond to electrical coupling elements. In this embodiment, strap third portion 202c may not be conductive and/or may include an electrical insulating material. Electrical insulating materials may include, but are not limited to, plastics (e.g., polyvinyl chloride, polyethylene), rubbers (e.g., thermoplastic rubber, neoprene (i.e., polychloroprene), silicone), fluoropolymers (e.g., polytetrafluoroethylene (e.g., Teflon®), polyvinylidene fluoride), etc. Continuing with this embodiment, load conductive path portions 210a, 210b may be configured to carry DC current and/or voltage (i.e., DC power) between features 208a, 208b and the HMWD. In some embodiments, first feature 208a and second feature 208b may be configured as both mechanical and electrical coupling elements. The first strap portion 202a and second strap portion 202b may be rigid or semi-rigid and third strap portion 202c may be generally semi-rigid to facilitate positioning the third strap portion 202c and/or the features 208a, 208b relative to the mechanical coupling region 206.

In some embodiments, third strap portion 202c and/or third load conductive path portion 210c may include at least a portion of one or more receiver coil(s), e.g., a portion of receiver coil 127b of FIG. 1B and/or receiver coil(s) 127d of FIG. 1C. A load conductive path may then include load conductive path portions 210a, 210b and 210c. In other words, third strap portion 202c is conductive for these embodiments. In these embodiments, first feature 208a and second feature 208b, if included, correspond to mechanical coupling elements (e.g., mechanical coupling elements 122b) configured to position at least third strap portion 202c and load conductive path portion 210c relative to a source conductive path that may be included in mechanical coupling region 206. In these embodiments, the third load conductive path portion 210c may include and/or may correspond to magnetic coupling element(s) 126b of FIG. 1A.

Figure 3:
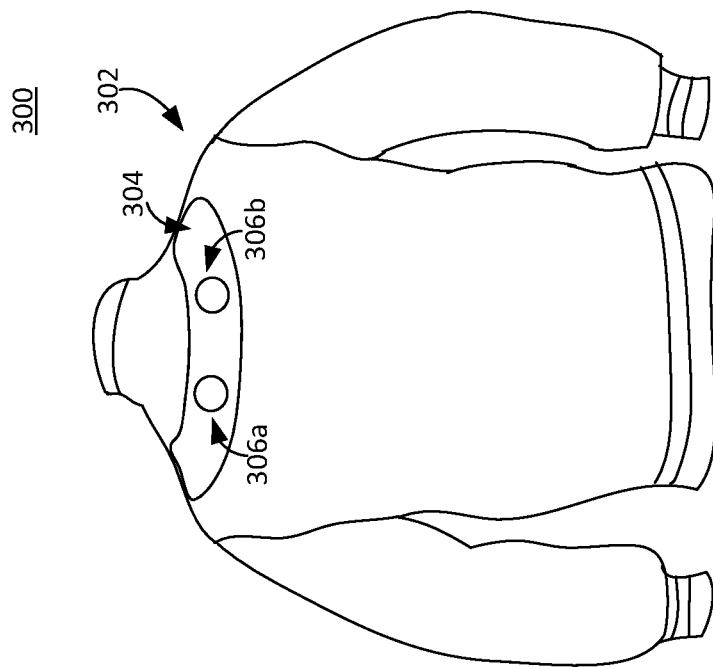
FIG. 3 illustrates an example source conductive path coupling region consistent with various embodiments of the present disclosure.

FIG. 3 illustrates an example 300 source conductive path coupling region consistent with various embodiments of the present disclosure. Example 300 illustrates a back view of a jacket (i.e., a garment) 302. Jacket 302 includes a mechanical coupling region 304 and may include one or more feature(s) 306a, 306b. Mechanical coupling region 304 is configured to include at least a portion of a source conductive path, as described herein. In some embodiments, similar to example 200, features 306a and 306b may correspond to mechanical coupling elements and/or electrical coupling elements, as described herein. Features 306a, 306b that correspond to electrical coupling elements may be configured terminate respective source conductive path portions that are configured to carry DC voltage(s) and/or current (i.e., DC power), as described herein.

In some embodiments, mechanical coupling region 304 may include at least a portion of one or more transmitter coil(s), e.g., at least a portion of transmitter coil 127a of FIG.

1B and/or at least a portion of each of one or more transmitter coil(s) 127c of FIG. 1C. In these embodiments, features 306a, 306b, if present, may correspond to mechanical coupling elements, as described herein. Turns of each source conductive path portion and/or of each transmitter coil may be distributed within mechanical coupling region 304 to increase an area of a magnetic coupling region to increase a likelihood of adequate coupling between a source conductive path and a load conductive path, as described herein. In these embodiments, features 306a and/or 306b may or may not be present. In other words, movement of a load conductive path portion relative to the mechanical coupling region 304 may be accommodated by a size of the magnetic coupling region.

Referring to FIGS. 2 and 3, in operation, strap 202, e.g., strap portion 202c, may be configured to contact mechanical coupling region 304 of jacket 302. Load conductive path portion 210c may then be positioned on or near mechanical coupling region 304. Load conductive path portion 210c may then be positioned relatively near at least a portion of a source conductive path, thus facilitating magnetic coupling between the source conductive path and the load conductive path. Features 306a and 306b, if present, may be positioned on or near features 208a and 208b, respectively. For example, features 208a, 208b may be configured to align with features 306a, 306b to mechanically (and/or electrically) couple the load conductive path to the source conductive path.

Figure 4:
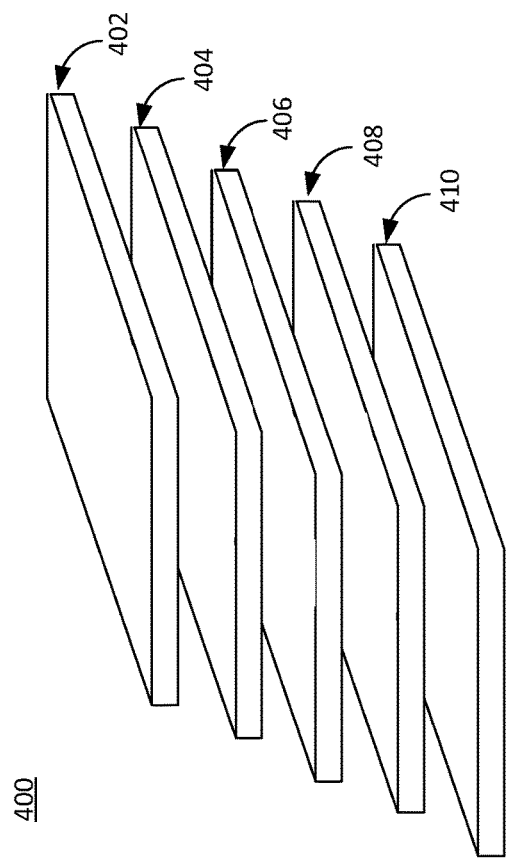
FIG. 4 illustrates a layer configuration for a garment that includes a source conductive path according to various embodiments of the present disclosure.

FIG. 4 illustrates a layer configuration 400 for a garment that includes a source conductive path according to various embodiments of the present disclosure. A garment, e.g., jacket 302 of FIG. 3, that includes a source conductive path may include one or more layer(s) 402, 404, 406, 408 and/or 410. An inner layer 402 is configured to be positioned closest to a user. A shielding layer 404 is positioned adjacent to the inner layer 402. An insulation layer 406 is positioned adjacent the shielding layer 404 opposing the inner layer 402. A conductive path layer 408 is positioned adjacent the insulation layer 406 opposing the shielding layer 404. An outer layer 410 is positioned adjacent the conductive path layer 408 opposing the insulation layer 406. The layer configuration may vary by location within the garment and/or type of garment, e.g., shirt, sweater, jacket, etc. For example, the shielding layer 404 and insulation layer 406 may be present in regions of the garment that include at least a portion of source conductive path. In another example, some adjacent layers may be combined, depending on garment type. Thus, not all layers may exist everywhere in the garment.

The inner layer 402 may generally be configured to provide comfort to the user. For example, for a shirt, inner layer 402 may touch a user's skin and thus, may be configured to be relatively soft, i.e., may be constructed of a relatively soft fabric. In another example, for a jacket, inner layer 402 may be relatively less soft since a user may generally wear another garment underneath the jacket, thus, a stiffer inner layer 402 may be acceptable.

Shielding layer 404 is configured to provide electromagnetic interference (EMI) and/or radio frequency (RF) exposure protection for the user and/or to reduce EMI/RF emissions in general. For example, for magnetic coupling configurations, the source conductive path may be configured to carry electromagnetic energy at a frequency on the order of ones or tens of megahertz (MHz). Shielding layer 404 is configured to be coupled to a ground of a power source, e.g., power source 102 of FIG. 1. Shielding layer 404 may be constructed of a conductive material, as described herein, and may be configured as a mesh to provide flexibility.

In some embodiments, inner layer 402 and shielding layer 404 may be combined into one layer. For example, for garments that are generally not configured to be worn next to a user's skin (e.g., a jacket), inner layer 402 and shielding layer 404 may be combined since user comfort effects of stiffness associated with the shielding layer 404 may be mitigated by a garment worn under the jacket.

Insulation layer 406 is configured to provide electrical isolation between a source conductive path included in conductive path layer 408 and shielding layer 404. Insulation layer 406 may include an insulating material, as described herein. Conductive path layer 408 is configured to include source conductive path, e.g., source conductive path 108 of FIG. 1. For example, the source conductive path 108 may be attached to the insulation layer 406. In this example, the conductive path layer 408 may correspond to the source conductive path 108. In another example, the conductive path layer 408 may include a layer material and the source conductive path.

Outer layer 410 material is generally related to a type of garment. Outer layer 410 is the outermost layer of a garment and may be selected based, at least in part, on aesthetic considerations and based, at least in part, on a type of garment. Outer layer 410 may generally not include EMI/RF shielding material that may interfere with the transfer of electrical and/or magnetic energy from a source conductive path to a load conductive path. In some embodiments, outer layer 410 and conductive path layer 408 may be combined into one layer. For example, a source conductive path may be woven into outer layer 410 fabric. In this embodiment, the conductive path layer 408 may then correspond to the outer layer 410.

Thus, an HMWD power supply system (and method) may include a source conductive path configured to couple to a load conductive path and to a power source. The source conductive path may be included in a garment, e.g., a shirt, a blouse, a jacket, a vest, a sweater, a pullover, a coat, a belt, etc. A power source (e.g., a battery pack) may be included in and/or attached to the garment. The load conductive path is configured to couple to the source conductive path and to a load, e.g., the HMWD. At least a portion of the load conductive path may be included in a strap coupled to the HMWD configured to at least partially encircle the user's neck. The source conductive path and/or load conductive path may each include one or more mechanical coupling element(s) configured to removably couple the source conductive path and the load conductive path.

Figure 5B:
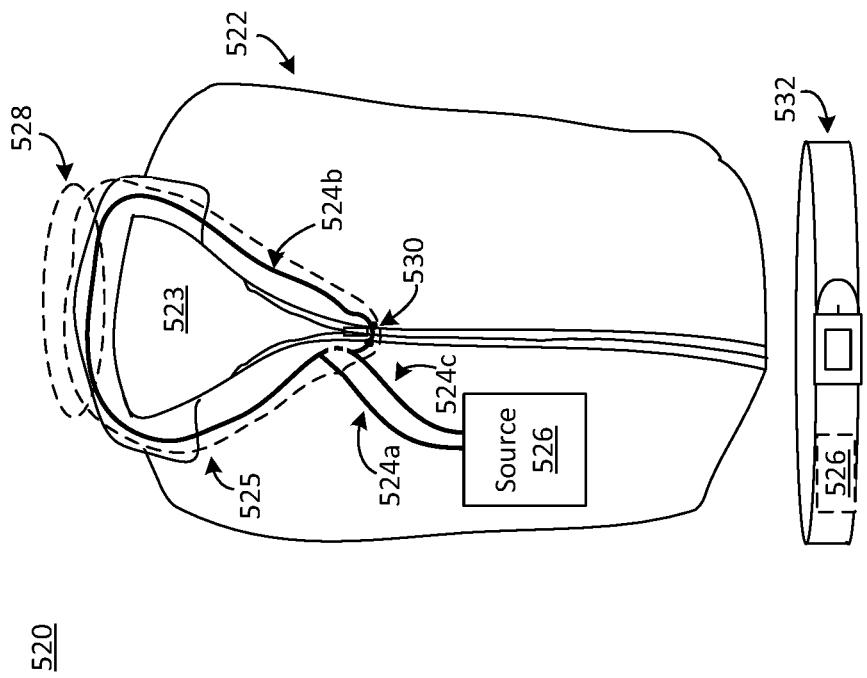
FIG. 5B illustrates an example source portion related to the load portion of the HMWD power supply system of FIG. 5A consistent with an embodiment of the present disclosure.
Figure 5A:
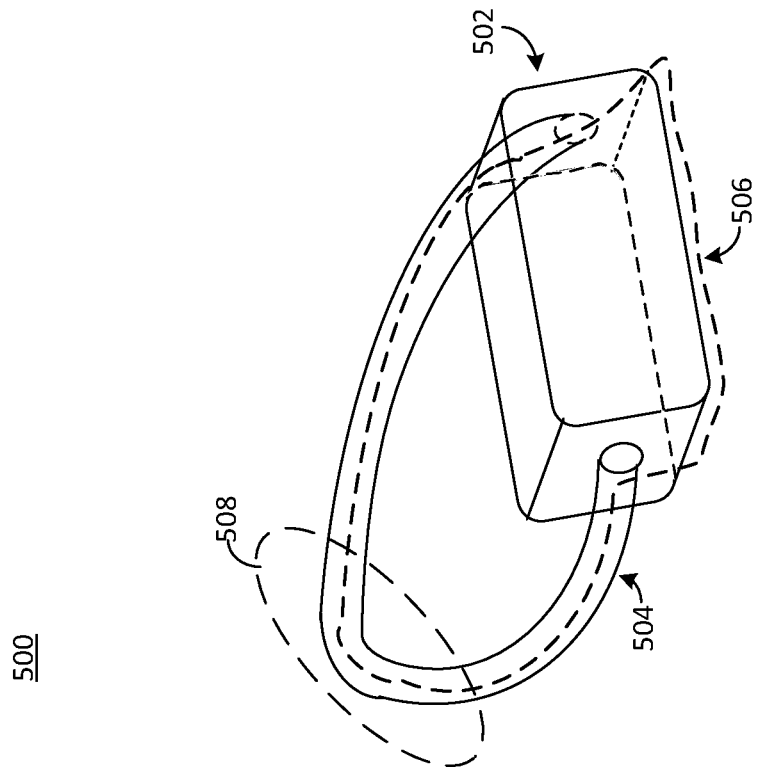
FIG. 5A illustrates an example load portion of an HMWD power supply system consistent with one embodiment of the present disclosure.

FIG. 5A illustrates an example load portion 500 of an HMWD power supply system consistent with one embodiment of the present disclosure. FIG. 5B illustrates an example source portion 520 related to the load portion 500 of the HMWD power supply system of FIG. 5A consistent with an embodiment of the present disclosure. Example load portion 500 may correspond to load portion 129 and example source portion 520 may correspond to source portion 101 of FIG. 1A. Load portion 500 and source portion 520 may correspond to the loosely coupled configuration 150 of FIG. 1B or the tightly coupled configuration 170 of FIG. 1C. FIGS. 5A and 5B may be best understood when considered in combination.

The load portion 500 includes an HMD 502 and a strap 504 that together may form a load conductive path 506. The HMD 502 is simplified for ease of illustration. The load conductive path 506 may include one or more conductive elements, as described herein. At least a portion of the conductive path 506 is included in strap 504 and a portion may be included on HMD 502. The portion of the load conductive path 506 that is included on HMD 502 may be positioned generally below the HMD 502 to facilitate coupling with source conductive path 524. The load conductive path 506 may thus encircle at least a portion of a magnetic coupling region. Region 508 corresponds to a mechanical coupling region and indicates respective portions of strap 504 and load conductive path 506 that may include at least a portion of one or more coupling element(s), e.g., coupling elements 122b, 124b, 126b, as described herein.

The source portion 520 includes a garment, e.g., a vest 522, and a source conductive path that includes a first portion 524a, a second portion 524b and a third portion 524c. The first and third source conductive path portions 524a, 524c may be coupled to a source 526. Source 526 corresponds to source 111 of FIGS. 1B and 1C. In one embodiment, source 526 may generally be located on a front portion of the vest 522. In another embodiment, source portion 520 may include a belt 532. In this embodiment, the source 526 may be positioned in or on the belt 532 and the first portion 524a and third portion 524c may extend to the belt 532. Region 528 corresponds to a mechanical coupling region and indicates a portion of the second source conductive path portion 524b that may include at least a portion of one or more coupling element(s). For example, when the load portion 500 and the source portion 520 are worn by a user, region 508 may generally align with region 528. Such alignment is configured to facilitate mechanical and/or electrical or magnetic coupling between the load conductive path 506 and the source conductive path second portion 524b. In an embodiment, the second portion 524b is configured to encircle a neck region 523 of the garment 522, e.g., in a magnetic coupling configuration. This embodiment corresponds to loosely coupled, resonant coupling configuration. In this embodiment, the second portion 524b may correspond to a transmitter coil, as described herein. A boundary 525 of a magnetic coupling region may then correspond to the second portion 524b. In another embodiment, second portion 524b may partially encircle neck region 523. In this embodiment, the second portion 524b may include one or more transmitter coils that may generally be included in coupling region 528. This second embodiment may then correspond to tightly coupled with resonant or inductive coupling.

In this example 520, the vest 522 includes a closure feature 530. Closure feature(s) may generally include zipper(s), button(s) and/or snap(s). In order to provide a continuous source conductive path 524a, 524b, 524c (i.e., a continuous second portion 524b), the closure feature 530 may include conductive material, as described herein. For example, the zipper 530 may include the conductive material. In another example, the closure feature 530 may be included in a tab and/or flap of garment material configured to traverse a vest 522 opening to provide the continuous conductive path.

FIG. 6A illustrates another example load portion 600 of an HMWD power supply system consistent with one embodiment of the present disclosure. FIG. 6B illustrates another example source portion 620 related to the load portion 600 of the HMWD power supply system of FIG. 6A consistent with an embodiment of the present disclosure. Example load portion 600 may correspond to load portion 129 and example source portion 620 may correspond to source portion 101 of FIG. 1A. Load portion 600 and source portion 620 may correspond to the loosely coupled configuration 150 of FIG. 1B or the tightly coupled configuration 170 of FIG. 1C. FIGS. 6A and 6B may be best understood when considered in combination.

The load portion 600 includes an optical HMD 602 and a strap 604. The optical HMD 602 includes a controller 612 and is simplified for ease of illustration. In this example 600, a load conductive path 606 originates on a first eyeglass temple 610a, e.g., at controller 612, continues onto strap 604 then along strap 604 to a second eyeglass temple 610b then turns and continues back along strap 604 onto the first eyeglass temple 610a and terminates at the controller 612. The strap 604 and/or load conductive path 606 may include one or more conductive elements, as described herein. In an embodiment, load conductive path 606 may include a plurality of loops (i.e., turns). For example, load conductive path 606 may include and/or correspond to a receiver coil, as described herein. In another example, load conductive path 606 may include a plurality of receiver coils, as described herein. Region 608 corresponds to a mechanical coupling region and indicates respective portions of strap 604 and load conductive path 606 that may include at least a portion of one or more coupling element(s), e.g., coupling element(s) 122b, 124b, 126b, as described herein.

The source portion 620 includes a garment, e.g., a vest 622, and a source conductive path that includes a first portion 624a, a second portion 624b and a third portion 624c. The source conductive path first and third portions 624a, 624c may be coupled to a source 626. Source 626 corresponds to source 111 of FIGS. 1B and 1C. In one embodiment, source 626 may generally be located on a front portion of the vest 622. In another embodiment, source portion 620 may include a belt 632. In this embodiment, the source 626 may be positioned in or on the belt 632 and the source conductive path first and third portions 624a, 624c may extend to the belt 632. Similar to example 520 of FIG. 5B, the vest 622 includes a closure feature 630. The source conductive path portions 624a, 624b, 624c are configured to avoid crossing a garment opening that may or may not be closed by closure feature 630.

The load conductive path 606 is configured to correspond to the source conductive path second portion 624b, at least in region 628. Region 628 corresponds to a mechanical coupling region and indicates a portion of the second source conductive path portion 624b that may include at least a portion of one or more coupling element(s). For example, when the load portion 600 and the source portion 620 are worn by a user, region 608 may generally align with region 628. Such alignment is configured to facilitate mechanical and/or electrical or magnetic coupling between the load conductive path 606 and the source conductive path second portion 624b. The second portion of source conductive path 624b is configured to partially encircle a neck region 623 of the garment 622, e.g., in a magnetic coupling configuration. This embodiment corresponds to loosely coupled, resonant coupling configuration. In an embodiment, the second portion 624b may correspond to a transmitter coil, as described herein. A boundary 625 of a magnetic coupling region may then correspond to the second portion 624b. In another embodiment, the second portion 624b may include one or more transmitter coils that may generally be included in coupling region 628. This second embodiment may then correspond to tightly coupled with resonant or inductive coupling.

FIG. 7 illustrates another example source portion 720 related to the load portion 500 of the HMWD power supply system of FIG. 5A consistent with one embodiment of the present disclosure. Load portion 500 and source portion 720 may correspond to the loosely coupled configuration 150 of FIG. 1B or the tightly coupled configuration 170 of FIG. 1C.

The source portion 720 includes a garment, e.g., a sweater 722, a source conductive path that includes a first portion 724a, a second portion 724b and a third portion 724c. The source portion 720 includes a source 726. Source 726 corresponds to source 111 of FIGS. 1B and 1C. The source conductive path portions 724a, 724b, 724c may each include one or more conductive element(s), as described herein. The source conductive path first and third portions 724a, 724c may be coupled to the source 726. Source 726 may generally be located on a front portion of the sweater 722. Region 728 corresponds to a mechanical coupling region and indicates a portion of the second source conductive path portion 724b that may include at least a portion of one or more coupling element(s), e.g., coupling element(s) 122b, 124b, 126b. For example, when the load portion 500 and the source portion 720 are worn by a user, region 508 of FIG. 5A may generally align with region 728. Such alignment is configured to facilitate mechanical and/or electrical or magnetic coupling (and energy transfer) between the load conductive path 506 and the source conductive path second portion 724b. The source conductive path second portion 724b is configured to at least partially encircle a neck region 723 of the garment 722, e.g., in a magnetic coupling configuration. In an embodiment, the second portion 724b may correspond to a transmitter coil, as described herein. This embodiment corresponds to loosely coupled, resonant coupling configuration. A boundary 725 of a magnetic coupling region may then correspond to the second portion 724b. In another embodiment, the second portion 724b may include one or more transmitter coils that may generally be included in coupling region 728. This second embodiment may then correspond to tightly coupled with resonant or inductive coupling.

FIG. 8 illustrates another example source portion 820 consistent with one embodiment of the present disclosure. The source portion 820 includes a garment, e.g., a sweater 822, and a first portion 824a and a second portion 824b of a source conductive path. The first portion 824a and the second portion 824b may partially encircle a neck region 823 of garment 822. The source portion 820 may further include a source 826 generally located on a front portion of the sweater 822. The source conductive path 824 may be coupled to the source 826.

The source portion 820 may further include a first electrical coupling element 828a and a second electrical coupling element 828b. The first electrical coupling element 828a is coupled to the first portion 824a and the second electrical coupling element 828b is coupled to the second portion 824b. For example, the first electrical coupling element 828a may be configured to couple to coupling element 208a and the second electrical coupling element 828b may be configured to couple to coupling element 208b of FIG. 2. In this example, strap portion 202c may then be non-conductive. Thus, example source portion 820 may be configured to couple a DC voltage and/or current to a load conductive path, e.g., load conductive path portions 210a and 210b of FIG. 2. Thus, source 826 may be configured to output a DC voltage and/or current.

Figure 9:
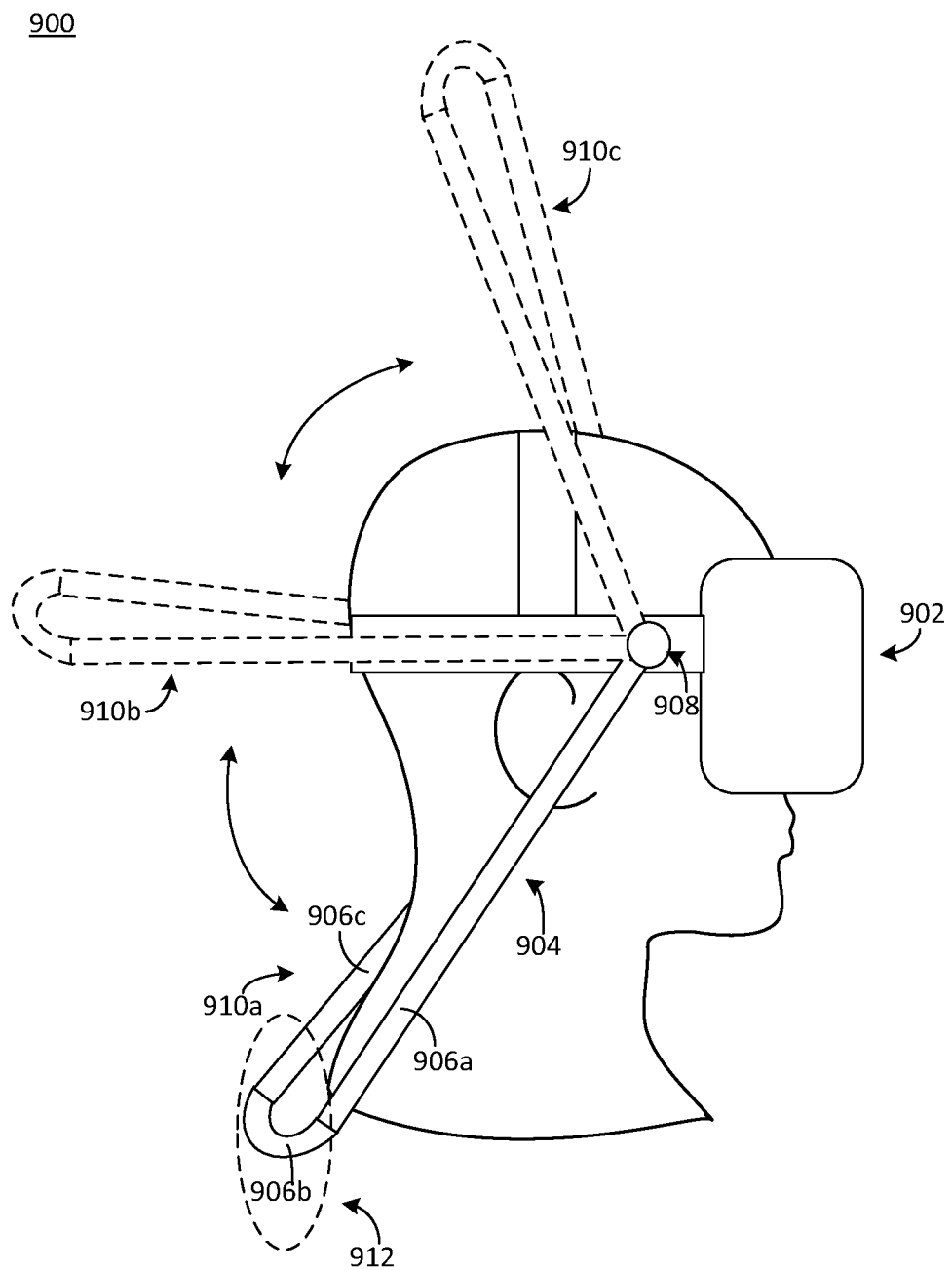
FIG. 9 illustrates an example HMWD with an adjustable strap consistent with various embodiments of the present disclosure.

FIG. 9 illustrates an example HMWD 902 with an adjustable strap 904 consistent with various embodiments of the present disclosure. Adjustable strap 904 may include three portions 906a, 906b, 906c. Portions 906a, 906c may be semi-rigid or rigid. Portion 906b may be rigid, semi-rigid or flexible. The adjustable strap 904 is coupled to HMWD 902 at a pivot point 908. Adjustable strap 904 may be configured to rotate about the pivot point 908. In a first position 910a, adjustable strap 904 may be configured to contact a coupling region 912, as described herein. In a second position 910b, adjustable strap 904 may be oriented with a long axis generally horizontal. In a third position 910c, adjustable strap 904 may be oriented with the long axis generally vertical. The second and third positions 910b, 910c may generally correspond to a storage position. In other words, the source conductive path and load conductive path may not be electrically or magnetically coupled when the strap 904 is in the second and third positions 910b, 910c.

Figure 10:
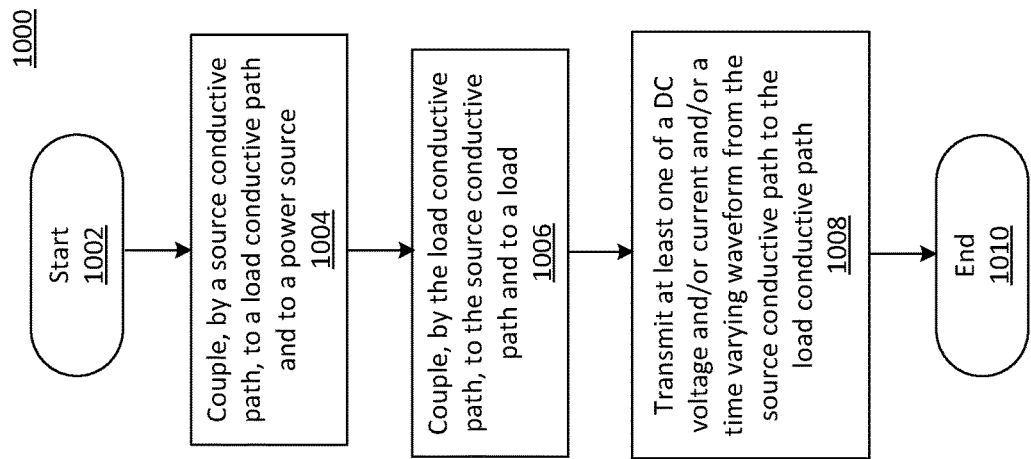
FIG. 10 illustrates a flowchart of operations consistent with various embodiments of the present disclosure.

FIG. 10 is a flowchart 1000 of HMWD power supply system operations according to various embodiments of the present disclosure. The operations may be performed, for example, by source conductive path 108 and/or load conductive path 130 of FIG. 1A.

Operations of this embodiment may begin at start 1002. Operation 1004 includes coupling, by a source conductive path, to a load conductive path and to a power source. The power source and the source conductive path may be included in a garment, as described herein. Operation 1006 includes coupling, by the load conductive path, to the source conductive path and to a load. The load conductive path may be related to an HMWD. Operation 1008 includes transmitting at least one of a DC voltage and/or current and/or a time varying waveform (e.g., voltage and/or current) from the source conductive path to the load conductive path. Process flow may then end at operation 1010.

While the flowchart of FIG. 10 illustrates operations according various embodiments, it is to be understood that not all of the operations depicted in FIG. 10 are necessary for other embodiments. In addition, it is fully contemplated herein that in other embodiments of the present disclosure, the operations depicted in FIG. 10 and/or other operations described herein may be combined in a manner not specifically shown in any of the drawings, and such embodiments may include less or more operations than are illustrated in FIG. 10. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Closely coupled magnetic induction may comply and/or be compatible with a closely coupled magnetic induction specification, title: System description wireless power transfer, Volume 1: Low power, Part 1: Interface definition, Version 1.1.2, released June 2013 by the Wireless Power Consortium, Institute of Electrical and Electronics Engineers (IEEE)—Industry Standards and Technology Organization (ISTO), Piscataway, N.J., and/or later and/or related versions of this specification.

Loosely coupled magnetic resonance may comply and/or be compatible with a loosely coupled wireless power transfer specification, title: Alliance for Wireless Power (A4WP) Baseline System Specification (BSS), Version 1.0, released January 2013 by the Alliance for Wireless Power (A4WP), Fremont, Calif., and/or later and/or related versions of this specification.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, a system and method include a source conductive path configured to couple to a load conductive path and to a power source. The source conductive path may be included in a garment, e.g., a shirt, a blouse, a jacket, a vest, a sweater, a pullover, a coat, a belt, etc. The power source (e.g., a battery pack) may be included in and/or attached to the garment. The load conductive path is configured to couple to a source conductive path and to a load, e.g., the HMWD. At least a portion of the load conductive path may be included in a strap coupled to the HMWD and configured to at least partially encircle the user's neck.

EXAMPLES

Examples of the present disclosure include subject material such as a method, means for performing acts of the method, a device, or of an apparatus or system related to a head mounted wearable device (HMWD) power supply system, as discussed below.

Example 1

According to this example there is provided an apparatus. The apparatus includes a source conductive path to couple to a load conductive path and to a power source. The source conductive path is included in a garment and the load conductive path is related to a head mounted wearable device (HMWD).

Example 2

This example includes the elements of example 1, wherein the source conductive path includes at least one of a mechanical coupling element and/or an electrical coupling element or a magnetic coupling element.

Example 3

This example includes the elements of example 1, wherein the source conductive path corresponds to a transmitter coil.

Example 4

This example includes the elements of example 1, wherein the source conductive path includes a transmitter coil.

Example 5

This example includes the elements of example 1, wherein the source conductive path is to carry a direct current (DC) voltage and/or current.

Example 6

This example includes the elements of example 1, wherein the source conductive path is to carry a time varying waveform related to the power source.

Example 7

This example includes the elements of example 1, wherein the source conductive path is to provide a positioning tolerance between the source conductive path and the load conductive path.

Example 8

This example includes the elements of example 1, wherein the source conductive path is to provide wireless energy transfer to the load conductive path.

Example 9

This example includes the elements of example 1, wherein the source conductive path includes a conductive element.

Example 10

This example includes the elements of example 9, wherein the conductive element includes one or more of a metal, graphite and/or a conductive polymer.

Example 11

This example includes the elements according to any one of examples 1 through 10, wherein the source conductive path includes a mechanical coupling element, the mechanical coupling element to provide a detachable mechanical coupling between the source conductive path and the load conductive path.

Example 12

This example includes the elements of example 11, wherein the mechanical coupling element is selected from the group including fasteners and magnetic elements.

Example 13

This example includes the elements of example 11, wherein the mechanical coupling element is a magnet.

Example 14

This example includes the elements of example 11, wherein the source conductive path further includes an electrical coupling element and the electrical coupling element and the mechanical coupling element are a same element.

Example 15

This example includes the elements of example 1 or 2, wherein the source conductive path includes an electrical coupling element and the source conductive path and load conductive path are to form an electrically conductive circuit when coupled.

Example 16

This example includes the elements of example 1 or 2, wherein the source conductive path includes a magnetic coupling element.

Example 17

This example includes the elements of example 16, wherein the magnetic coupling element is to provide at least one of inductive coupling and resonant coupling.

Example 18

This example includes the elements of example 16, wherein the source conductive path is to tightly or loosely couple to the load conductive path.

Example 19

This example includes the elements of example 16, wherein the source conductive path is to tightly couple to the load conductive path and the magnetic element is to provide inductive coupling.

Example 20

This example includes the elements of example 16, wherein the source conductive path is to loosely couple to the load conductive path and the magnetic element is to provide inductive coupling or resonant coupling.

Example 21

This example includes the elements of example 3 or 4, wherein the transmitter coil includes a magnetic core.

Example 22

This example includes the elements of example 3 or 4, wherein a shape of the transmitter coil is at least one of circular, ellipsoidal, rectangular and/or random.

Example 23

This example includes the elements of example 6, wherein a frequency of the time varying waveform is in a range of 1.0 Megahertz (MHz) to 50 MHz.

Example 24

This example includes the elements of example 23, wherein a frequency of the time varying waveform is 6.78 MHz.

Example 25

This example includes the elements of example 4, wherein the transmitter coil is configured for inductive coupling or resonant coupling.

Example 26

This example includes the elements of example 1 or 2, wherein the source conductive path includes a plurality of transmitter coils.

Example 27

According to this example there is provided an apparatus. The apparatus includes a load conductive path to couple to a source conductive path and to a load. The load conductive path is related to a head mounted wearable device (HMWD) and the source conductive path is included in a garment.

Example 28

This example includes the elements of example 27, wherein the load conductive path includes at least one of a mechanical coupling element and/or an electrical coupling element or a magnetic coupling element.

Example 29

This example includes the elements of example 27, wherein the load conductive path corresponds to a receiver coil.

Example 30

This example includes the elements of example 27, wherein the load conductive path includes a receiver coil.

Example 31

This example includes the elements of example 27, wherein the load conductive path is to carry a direct current (DC) voltage and/or current.

Example 32

This example includes the elements of example 27, wherein the load conductive path is to carry a time varying waveform related to a power source.

Example 33

This example includes the elements of example 27, wherein the load conductive path includes a conductive element.

Example 34

This example includes the elements of example 33, wherein the conductive element includes one or more of a metal, graphite and/or a conductive polymer.

Example 35

This example includes the elements of example 27, wherein at least a portion of the load conductive path is rigid, semi-rigid or flexible.

Example 36

This example includes the elements according to any one of examples 27 through 35, wherein the load conductive path includes a mechanical coupling element. The mechanical coupling element is to provide a detachable mechanical coupling between the load conductive path and the source conductive path.

Example 37

This example includes the elements of example 36, wherein the mechanical coupling element is selected from the group including fasteners and magnetic elements.

Example 38

This example includes the elements of example 36, wherein the mechanical coupling element is a magnet.

Example 39

This example includes the elements of example 36, wherein the load conductive path further includes an electrical coupling element and the electrical coupling element and the mechanical coupling element are a same element.

Example 40

This example includes the elements of example 27 or 28, wherein the load conductive path includes an electrical coupling element and the load conductive path and source conductive path are to form an electrically conductive circuit when coupled.

Example 41

This example includes the elements of example 27 or 28, wherein the load conductive path includes a magnetic coupling element.

Example 42

This example includes the elements of example 41, wherein the magnetic element is configured to provide at least one of inductive coupling and resonant coupling.

Example 43

This example includes the elements of example 27, wherein the load conductive path is to tightly or loosely couple to the source conductive path.

Example 44

This example includes the elements of example 41, wherein the load conductive path is to tightly couple to the source conductive path and the magnetic element is to provide inductive coupling.

Example 45

This example includes the elements of example 41, wherein the load conductive path is to loosely couple to the source conductive path and the magnetic element is to provide inductive coupling or resonant coupling.

Example 46

This example includes the elements of example 29 or 30, wherein the receiver coil includes a magnetic core.

Example 47

This example includes the elements of example 29 or 30, wherein a shape of the receiver coil is at least one of circular, ellipsoidal, rectangular and/or random.

Example 48

This example includes the elements of example 32, wherein a frequency of the time varying waveform is in a range of 1.0 Megahertz (MHz) to 50 MHz.

Example 49

This example includes the elements of example 48, wherein a frequency of the time varying waveform is 6.78 Megahertz (MHz).

Example 50

This example includes the elements of example 30, wherein the receiver coil is configured for inductive coupling or resonant coupling.

Example 51

This example includes the elements of example 27, wherein the load conductive path includes a plurality of receiver coils.

Example 52

According to this example there is provided a system. The system includes a power source and a garment. The garment includes a source conductive path to couple to a load conductive path and to the power source. The load conductive path is related to a head mounted wearable device (HMWD).

Example 53

This example includes the elements of example 52, wherein the garment is selected from the group including a shirt, a blouse, a jacket, a vest, a sweater, a pullover, a coat and a belt.

Example 54

This example includes the elements of example 52, wherein the garment includes a plurality of layers and the source conductive path is included in at least one layer.

Example 55

This example includes the elements of example 52, wherein the source conductive path is to at least partially encircle a neck region of the garment.

Example 56

This example includes the elements of example 52, wherein the garment includes a coupling region, at least a portion of the source conductive path included in the coupling region

Example 57

This example includes the elements of example 52, wherein the source conductive path includes at least one of a mechanical coupling element and/or an electrical coupling element or a magnetic coupling element.

Example 58

This example includes the elements of example 52, wherein at least one of the power source is included in the garment and/or the power source is attached to the garment.

Example 59

This example includes the elements of example 52, wherein the source conductive path is to provide a positioning tolerance between the source conductive path and the load conductive path.

Example 60

This example includes the elements according to any one of examples 52 to 59, wherein the source conductive path is to provide wireless energy transfer to the load conductive path.

Example 61

This example includes the elements according to any one of examples 52 to 59, further including source power conversion circuitry coupled to the source conductive path.

Example 62

This example includes the elements of example 56, wherein the source conductive path includes a transmitter coil, the transmitter coil includes a plurality of turns and at least a portion of the turns are distributed within the coupling region.

Example 63

This example includes the elements according to any one of examples 52 to 59, wherein the garment includes at least one layer.

Example 64

This example includes the elements according to any one of examples 52 to 59, wherein the garment includes a plurality of layers.

Example 65

This example includes the elements of example 52, wherein the garment includes an inner layer, a shielding layer, an insulation layer, a conductive path layer and an outer layer

Example 66

This example includes the elements of example 65, wherein the shielding layer is positioned adjacent the inner layer, the insulation layer is positioned adjacent the shielding layer and opposing the inner layer, the conductive path layer is positioned adjacent the insulation layer and opposing the shielding layer and the outer layer is positioned adjacent the conductive path layer and opposing the insulation layer.

Example 67

This example includes the elements of example 65, wherein the inner layer and the shielding layer are combined into one layer.

Example 68

This example includes the elements of example 65, wherein a portion of the garment includes the shielding layer and the insulation layer.

Example 69

This example includes the elements of example 65, wherein the shielding layer is coupled to a ground of the power source.

Example 70

This example includes the elements of example 65, wherein the shielding layer is constructed of a conductive material.

Example 71

This example includes the elements of example 70, wherein the shielding layer is configured as a mesh.

Example 72

This example includes the elements of example 65, wherein the insulation layer includes at least one of a plastic, a rubber and/or a fluoropolymer.

Example 73

This example includes the elements of example 65, wherein the source conductive path is attached to the insulation layer and the conductive path layer corresponds to the source conductive path.

Example 74

This example includes the elements of example 65, wherein the outer layer and the conductive path layer are one layer.

Example 75

This example includes the elements of example 74, wherein the source conductive path is woven into the outer layer.

Example 76

This example includes the elements according to any one of examples 52 to 59, wherein the garment includes a closure feature, the closure feature including conductive material.

Example 77

According to this example there is provided a system. The system includes a strap to couple to a head mounted wearable device (HMWD) and a load conductive path to couple to a source conductive path and to a load. The load conductive path is related to the head mounted wearable device (HMWD) and the source conductive path included in a garment.

Example 78

This example includes the elements of example 77, wherein at least a portion of the load conductive path is included in the strap.

Example 79

This example includes the elements of example 77, wherein at least a portion of the strap is rigid, semi-rigid or flexible.

Example 80

This example includes the elements of example 77, wherein at least a portion of the strap is to align with a coupling region in the garment.

Example 81

This example includes the elements of example 77, wherein the load conductive path includes at least one of a mechanical coupling element and/or an electrical coupling element or a magnetic coupling element.

Example 82

This example includes the elements according to any one of examples 77 through 81, wherein the strap includes a receiver coil.

Example 83

This example includes the elements according to any one of examples 77 through 81, wherein the strap is a lanyard.

Example 84

This example includes the elements according to any one of examples 77 through 81, wherein the HMWD is a head mounted display (HMD).

Example 85

This example includes the elements according to any one of examples 77 through 81, further including load power conversion circuitry coupled to the load conductive path.

Example 86

This example includes the elements according to any one of examples 77 through 81, wherein the load corresponds to the HMWD.

Example 87

This example includes the elements according to any one of examples 77 through 81, wherein a portion of the strap includes an electrical insulating material, the portion to align with a coupling region included in the garment.

Example 88

This example includes the elements of example 87, wherein the electrical insulating material is selected from the group including a plastic, a rubber and/or a fluoropolymer.

Example 89

This example includes the elements according to any one of examples 77 through 81, wherein the strap includes at least a portion of the load conductive path.

Example 90

This example includes the elements according to any one of examples 77 through 81, wherein the strap includes at least a portion of a receiver coil.

Example 91

This example includes the elements according to any one of examples 77 through 81, wherein the strap includes a plurality of receiver coils.

Example 92

This example includes the elements according to any one of examples 77 through 81, wherein the strap includes a mechanical coupling element to position at least a portion of the load conductive path relative to a coupling region included in the garment.

Example 93

This example includes the elements according to any one of examples 77 through 81, wherein the load conductive path encircles at least a portion of a magnetic coupling region.

Example 94

This example includes the elements according to any one of examples 77 through 81, wherein the strap includes a first portion of the load conductive path and a second portion of the load conductive path is included on the HWMD.

Example 95

This example includes the elements according to any one of examples 77 through 81, wherein the HWMD includes eyeglasses and the load conductive path originates at a first eyeglass temple, continues along the strap to the second eyeglass temple, turns and continues along the strap to the first eyeglass temple.

Example 96

This example includes the elements of example 77, wherein the strap is adjustable.

Example 97

This example includes the elements of example 96, wherein the strap includes a first portion, a second portion and a third portion.

Example 98

This example includes the elements of example 97, wherein the first portion and third portion are semi-rigid or rigid and the second portion is rigid, semi-rigid or flexible.

Example 99

This example includes the elements of example 96, wherein the strap is coupled to the HMWD at a pivot point, the strap to rotate about the pivot point to each of a plurality of positions.

Example 100

This example includes the elements of example 99, wherein the load conductive path is to electrically or magnetically couple to the source conductive path when the strap is in one of the plurality of positions.

Example 101

According to this example there is provided a method. The method includes coupling, by a source conductive path, to a load conductive path; and coupling, by the source conductive path, to a power source. The source conductive path is included in a garment and the load conductive path is related to a head mounted wearable device (HMWD).

Example 102

This example includes the elements of example 101, further including coupling, by the load conductive path, to the source conductive path; and coupling, by the load conductive path, to a load.

Example 103

This example includes the elements of example 101, further including transmitting at least one of a direct current (DC) voltage and/or current and/or a time varying waveform from the source conductive path to the load conductive path.

Example 104

This example includes the elements of any one of examples 101 to 103, wherein the source conductive path and the load conductive path each includes at least one of a mechanical coupling element and/or an electrical coupling element or a magnetic coupling element.

Example 105

This example includes the elements of any one of examples 101 to 103, wherein the source conductive path corresponds to a transmitter coil and the load conductive path corresponds to a receiver coil.

Example 106

This example includes the elements of any one of examples 101 to 103, wherein the source conductive path includes a transmitter coil and the load conductive path includes a receiver coil.

Example 107

This example includes the elements of any one of examples 101 to 103, further including carrying, by the source conductive path, a direct current (DC) voltage and/or current and carrying by the load conductive path, the DC voltage and/or current.

Example 108

This example includes the elements of any one of examples 101 to 103, further including carrying, by the source conductive path, a source time varying waveform related to the power source and carrying, by the load conductive path, a load time varying waveform related to the source time varying waveform.

Example 109

This example includes the elements of any one of examples 101 to 103, further including providing, by the source conductive path, a positioning tolerance between the source conductive path and the load conductive path.

Example 110

This example includes the elements of any one of examples 101 to 103, further including providing, by the source conductive path, wireless energy transfer to the load conductive path.

Example 111

This example includes the elements of any one of examples 101 to 103, wherein the source conductive path includes a first mechanical coupling element and the load conductive path includes a second mechanical coupling element, and further including detachably mechanically coupling, by the mechanical coupling elements, the source conductive path and the load conductive path

Example 112

This example includes the elements of any one of examples 101 to 103, wherein the source conductive path includes a first electrical coupling element and the load conductive path includes a second electrical coupling element, and further including coupling, by the electrical coupling elements, the source conductive path and load conductive path are to form an electrically conductive circuit.

Example 113

This example includes the elements of any one of examples 101 to 103, wherein the source conductive path and the load conductive path each includes a respective magnetic coupling element.

Example 114

This example includes the element of example 113, further including, providing, by the magnetic coupling elements, at least one of inductive coupling and resonant coupling.

Example 115

This example includes the elements of any one of examples 101 to 103, further including at least one of tightly or loosely coupling, by the source conductive path, to the load conductive path.

Example 116

This example includes the element of example 103, wherein a frequency of the time varying waveform is in a range of 1.0 Megahertz (MHz) to 50 MHz.

Example 117

This example includes the elements of any one of examples 105 to 106, wherein the at least one of the transmitter coil and/or the receiver coil include a magnetic core.

Example 118

This example includes the elements of any one of examples 105 to 106, wherein the transmitter coil and the receiver coil are configured for inductive coupling or resonant coupling.

Example 119

This example includes the elements of any one of examples 101 to 103, wherein at least one of the source conductive path includes a plurality of transmitter coils and/or the load conductive path includes a plurality of receiver coils.

Example 120

This example includes the elements of any one of examples 101 to 103, wherein the garment is selected from the group including a shirt, a blouse, a jacket, a vest, a sweater, a pullover, a coat and a belt.

Example 121

This example includes the elements of any one of examples 101 to 103, wherein the garment includes a plurality of layers and the source conductive path is included in at least one layer.

Example 122

This example includes the elements of any one of examples 101 to 103, further including at least partially encircling, by the source conductive path, a neck region of the garment.

Example 123

This example includes the elements of any one of examples 101 to 103, wherein the garment includes a coupling region, at least a portion of the source conductive path included in the coupling region.

Example 124

This example includes the elements of any one of examples 101 to 103, wherein at least one of the power source is included in the garment and/or the power source is attached to the garment.

Example 125

This example includes the elements of any one of examples 101 to 103, further including providing, by the source conductive path, a positioning tolerance between the source conductive path and the load conductive path.

Example 126

This example includes the elements of any one of examples 101 to 103, wherein the garment includes at least one layer.

Example 127

This example includes the elements of any one of examples 101 to 103, wherein the wherein the garment includes an inner layer, a shielding layer, an insulation layer, a conductive path layer and an outer layer.

Example 128

This example includes the elements of any one of examples 101 to 103, further including positioning, by mechanical coupling element, at least a portion of the load conductive path relative to a coupling region included in the garment, the mechanical coupling element included in a strap coupled to the HWMD.

Example 129

This example includes the elements of any one of examples 101 to 103, wherein the load conductive path encircles at least a portion of a magnetic coupling region.

Example 130

Another example of the present disclosure is a system including at least one device arranged to perform the method of any one of examples 101 to 129.

Example 131

Another example of the present disclosure is a device including means to perform the method of any one of examples 101 to 129.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:
1. An apparatus comprising:
   a source conductive path to detachably couple a power source to a load conductive path,
   the source conductive path included in a garment and the load conductive path coupled to a head mounted wearable device (HMWD);
   wherein, a transmitter coil of the source conductive path and a receiver coil of the load conductive path are magnetically coupled, via a magnetic induction coupling or a magnetic resonance coupling, to provide wireless energy transfer;
wherein the magnetic induction coupling uses magnetic induction with an operating frequency in the range of 50 Hz to 500 kHz and comprises:
a magnetic induction coupling distance between the transmitter coil and the receiver coil in the range of 5 mm to 10 mm; and
wherein the magnetic resonance coupling uses magnetic resonance with an operating frequency in the range of 1.0 MHz to 50 MHz and comprises:
a first magnetic resonance coupling distance between a first end of the transmitter coil and a first end of the receiver coil, and a second magnetic resonance coupling distance between a second end of the transmitter coil and a second end of the receiver coil, wherein the first magnetic resonance coupling distance is in the range of 20 mm to 40 mm and is less than the second magnetic resonance coupling distance.

2. The apparatus of claim 1, wherein the source conductive path comprises one or more of a mechanical coupling element, an electrical coupling element, and a magnetic coupling element.

3. The apparatus of claim 1, wherein the source conductive path is to carry a time varying waveform related to the power source.

4. An apparatus comprising:
a load conductive path to detachably couple to a source conductive path and to couple to a head mounted wearable device (HMWD) that comprises a load,
the source conductive path included in a garment;
wherein, a transmitter coil of the source conductive path and a receiver coil of the load conductive path are magnetically coupled, via a magnetic induction coupling or a magnetic resonance coupling, to provide wireless energy transfer;
wherein the magnetic induction coupling uses magnetic induction with an operating frequency in the range of 50 Hz to 500 kHz and comprises:
a magnetic induction coupling distance between the transmitter coil and the receiver coil in the range of 5 mm to 10 mm; and
wherein the magnetic resonance coupling uses magnetic resonance with an operating frequency in the range of 1.0 MHz to 50 MHz and comprises:
a first magnetic resonance coupling distance between a first end of the transmitter coil and a first end of the receiver coil, and a second magnetic resonance coupling distance between a second end of the transmitter coil and a second end of the receiver coil, wherein the first magnetic resonance coupling distance is in the range of 20 mm to 40 mm and is less than the second magnetic resonance coupling distance.

5. The apparatus of claim 4, wherein the load conductive path comprises one or more of a mechanical coupling element, an electrical coupling element, and a magnetic coupling element.

6. The apparatus of claim 4, wherein the load conductive path is to carry a time varying waveform related to a power source.

7. A system comprising:
a power source; and
a garment comprising a source conductive path to detachably couple to a load conductive path and to couple to the power source, the load conductive path coupled to a head mounted wearable device (HMWD);
wherein, a transmitter coil of the source conductive path and a receiver coil of the load conductive path are magnetically coupled, via a magnetic induction coupling or a magnetic resonance coupling, to provide wireless energy transfer;
wherein the magnetic induction coupling uses magnetic induction with an operating frequency in the range of 50 Hz to 500 kHz and comprises:
a magnetic induction coupling distance between the transmitter coil and the receiver coil in the range of 5 mm to 10 mm; and
wherein the magnetic resonance coupling uses magnetic resonance with an operating frequency in the range of 1.0 MHz to 50 MHz and comprises:
a first magnetic resonance coupling distance between a first end of the transmitter coil and a first end of the receiver coil, and a second magnetic resonance coupling distance between a second end of the transmitter coil and a second end of the receiver coil, wherein the first magnetic resonance coupling distance is in the range of 20 mm to 40 mm and is less than the second magnetic resonance coupling distance.

8. The system of claim 7, wherein the garment is selected from the group comprising a shirt, a blouse, a jacket, a vest, a sweater, a pullover, a coat and a belt.

9. The system of claim 7, wherein the garment comprises a plurality of layers and the source conductive path is included in at least one layer.

10. The system of claim 7, wherein the source conductive path is to at least partially encircle a neck region of the garment.

11. The system of claim 7, wherein the garment comprises a coupling region, at least a portion of the source conductive path included in the coupling region.

12. The system of claim 7, wherein the source conductive path comprises at least one of a group that includes a mechanical coupling element, an electrical coupling element, and a magnetic coupling element.

13. A system comprising:
a strap to couple to a head mounted wearable device (HMWD) that includes a load; and
a load conductive path coupled to the load, the load conductive path to detachably couple to a source conductive path,
the source conductive path included in a garment that is distinct and separate from the HMWD;
wherein, a transmitter coil of the source conductive path and a receiver coil of the load conductive path are magnetically coupled, via a magnetic induction coupling or a magnetic resonance coupling, to provide wireless energy transfer;
wherein the magnetic induction coupling uses magnetic induction with an operating frequency in the range of 50 Hz to 500 kHz and comprises:
a magnetic induction coupling distance between the transmitter coil and the receiver coil in the range of 5 mm to 10 mm; and
wherein the magnetic resonance coupling uses magnetic resonance with an operating frequency in the range of 1.0 MHz to 50 MHz and comprises:
a first magnetic resonance coupling distance between a first end of the transmitter coil and a first end of the receiver coil, and a second magnetic resonance coupling distance between a second end of the transmitter coil and a second end of the receiver coil, wherein the first magnetic resonance coupling distance is in the range of 20 mm to 40 mm and is less than the second magnetic resonance coupling distance.

14. The system of claim 13, wherein at least a portion of the load conductive path is included in the strap.

15. The system of claim 13, wherein at least a portion of the strap is rigid, semi-rigid or flexible.

16. The system of claim 13, wherein at least a portion of the strap is to align with a coupling region in the garment.

17. The system of claim 13, wherein the load conductive path comprises at least one of a group that includes a mechanical coupling element, an electrical coupling element, and a magnetic coupling element.

18. The system of claim 13, wherein the strap comprises the receiver coil.

* * * * *